United States Patent [19]

Schell et al.

[11] Patent Number: 5,794,045

[45] Date of Patent: Aug. 11, 1998

[54] METHOD OF AND APPARATUS FOR EFFICIENTLY DEBUGGING PROGRAMS GIVEN LIMITED SYSTEM RESOURCES

[75] Inventors: William Martin Schell, Watchung; Kanwar Jit Singh, Matawan, both of N.J.; Guy Ashley Story, New York, N.Y.; Pasupathi Ananta Subrahmanyam, Freehold, N.J.

[73] Assignee: Lucent Technologies Inc., Murray Hill, N.J.

[21] Appl. No.: 769,290

[22] Filed: Dec. 18, 1996

Related U.S. Application Data

[63] Continuation of Ser. No. 307,974, Sep. 16, 1994, abandoned.
[51] Int. Cl.$^6$ ........................................................ G06F 9/45
[52] U.S. Cl. ................................................................ 395/704
[58] Field of Search .............................. 395/704, 705, 395/706, 708

[56] References Cited

PUBLICATIONS

U.S. application No. 08/175,059, filed Dec. 29, 1993.

Emerson, E. A. et al., "Automatic Verification Of Finite State Concurrent Systems Using Temporal Logic Specifications," ACM Transactions On Programming Languages and Sytems, Sec. 8(2), Apr., 1986, pp. 244–263.

Aho, Sethi, and Ullman, "Compilers: Principles, Techniques, And Tools," Addison Wesley, 1986.

Primary Examiner—Emanuel Todd Voeltz
Assistant Examiner—Peter J. Corcoran, III

[57] ABSTRACT

A device for creating and analyzing larger symbolic representations without the limitations imposed by available resources of previous devices is disclosed. More specifically, a debugger for debugging a symbolic representation of a program is disclosed. The debugger comprising means for inputting a set of characteristics, means for linking the set of characteristics to the symbolic representation, means for identifying a first portion of the symbolic representation mutually exclusive from the set of characteristics, and means for analyzing a second portion of the symbolic representation for the set of characteristics wherein the second portion being mutually exclusive from the first portion. A method of debugging programs using the debugger, in addition to the resultant debugged program, is also disclosed.

32 Claims, 2 Drawing Sheets

METHOD OF AND APPARATUS FOR EFFICIENTLY DEBUGGING PROGRAMS GIVEN LIMITED SYSTEM RESOURCES

This is a continuation of application Ser. No. 08/307,974 filed Sep. 16, 1994, now abandoned.

FIELD OF THE INVENTION

This invention relates to debugging software programs. More specifically, the invention relates to limited resource systems for debugging programs and the programs that result therefrom.

BACKGROUND OF THE INVENTION

A software program typically undergoes numerous tests prior to being made available to the public. The tests are designed to determine if the software program has any "glitches" or "bugs" in it. The testing is performed with a debugger.

Some debuggers operate upon a symbolic representation of the software program. An example of a symbolic representation of the software program is a "finite state machine" representation. This is a representation of a machine that has a finite number of states. A machine that operates in accordance with the machine representation moves from state to state until a particular task is complete. The machine knows to which state to move based upon inputs. The machine provides outputs as it moves from one state to another state within the set of finite states.

The testing of software programs requires debugger system resources such as memory and processor time. For software programs which contain a relatively small number of symbols (e.g., states of finite state machine representations), an exhaustive (or brute force) analysis exploring each possible combination of, e.g., inputs and machine states may be performed to uncover program bugs.

However, many software programs contain a relatively large number of symbols. Since the number of operations needed to analyze the symbolic representation of the software program grows exponentially with the number of symbols, programs having symbolic representations with a relatively large number of symbols may not be analyzable in this manner. This is because resource requirements needed during debugging may exceed available debugger system resources. Emerson, E. A., et al., "Automatic Verification Of Finite State Concurrent Systems Using Temporal Logic Specifications", ACM Transactions On Programming Languages and Systems, Sec. 8(2), pages 244-263, April, 1986. In many instances, due to extraordinary resource requirements needed during debugging (e.g., processor time required during testing is extremely large), it is not practical to analyze symbolic representations. In other words, more severe situations, the amount of debugger system resources (e.g., memory) does not even allow for the creation of symbolic representations due to their size. In fact, some have expressed a need for the ability to create and analyze larger symbolic representations.

SUMMARY OF THE INVENTION

We have invented a method for creating and analyzing symbolic representations without the limitations imposed by available debugger system resources of previous debugger systems. In accordance with the present invention, certain symbols in the symbolic representation of the program are trimmed out of the program (i.e., eliminated from consideration) prior to analyzing the program for the presence or absence of a particular characteristic or set of characteristics. This results in a trimmed program which is represented by fewer symbolic states than the original program. A debugger capable of implementing above described method, in addition to a resultant debugged program, is also disclosed.

Advantageously, since the trimmed program contains fewer symbolic states than the original program, the method permits software programs to be debugged using less memory than previous debuggers.

Also advantageously, the method permits software programs to be debugged in a manner that is more computationally efficient than previous debuggers. Other objects and advantages of the present invention will become apparent from the description below and the drawings.

DETAILED DESCRIPTION

The present invention will be described by way of example. The environment in which the example will be described is the interactive television ("ITV") environment.

In the ITV environment, a user or subscriber may request a number of services simultaneously from an ITV system. For example, the user at a subscriber location may request to, in one portion or window of a television screen, watch a re-play of a historic event (e.g., the first time man landed on the moon) and, in another portion of a television screen, watch a movie. As will be appreciated by those skilled in the art, these requests would require use of more than one video decoder because two video streams would need to be decoded. Further, due to the interactive nature of ITV, it is difficult, if not impossible, to predict the circumstances under which more decoders (i.e., ITV resources) may be requested by a user. If it is determined that an ITV application program, which is executed in response to a user request, executes such that the number of decoders requested exceeds the number of decoders available to the subscriber (e.g., the number of decoders available in the subscriber's set top box), the program is deemed unacceptable and should be modified. The specific example below focuses on this determination, namely whether it is possible for a program to request, during its execution, more decoders than are available.

After an explanation of the environment in which the illustrative example may arise, an identifying and trimming step, in addition to an analysis step, will be described.

1. Environment of the Example

Assume one wanted to determine whether the number of decoders that could be requested by a user requesting execution of a program exceeded the number of decoders available in the system (e.g., in a set top box). Assume that the number of decoders available is three and that these can decode stored movies, shows, stored news highlights, etc. Further assume that the only command requiring a decoder is a "PLAY" command and that the only command that would alleviate the need for a decoder is the "STOP" command. As will be seen below, the "PLAY" and "STOP" commands may be issued by either the user or the ITV system.

Figure 1:
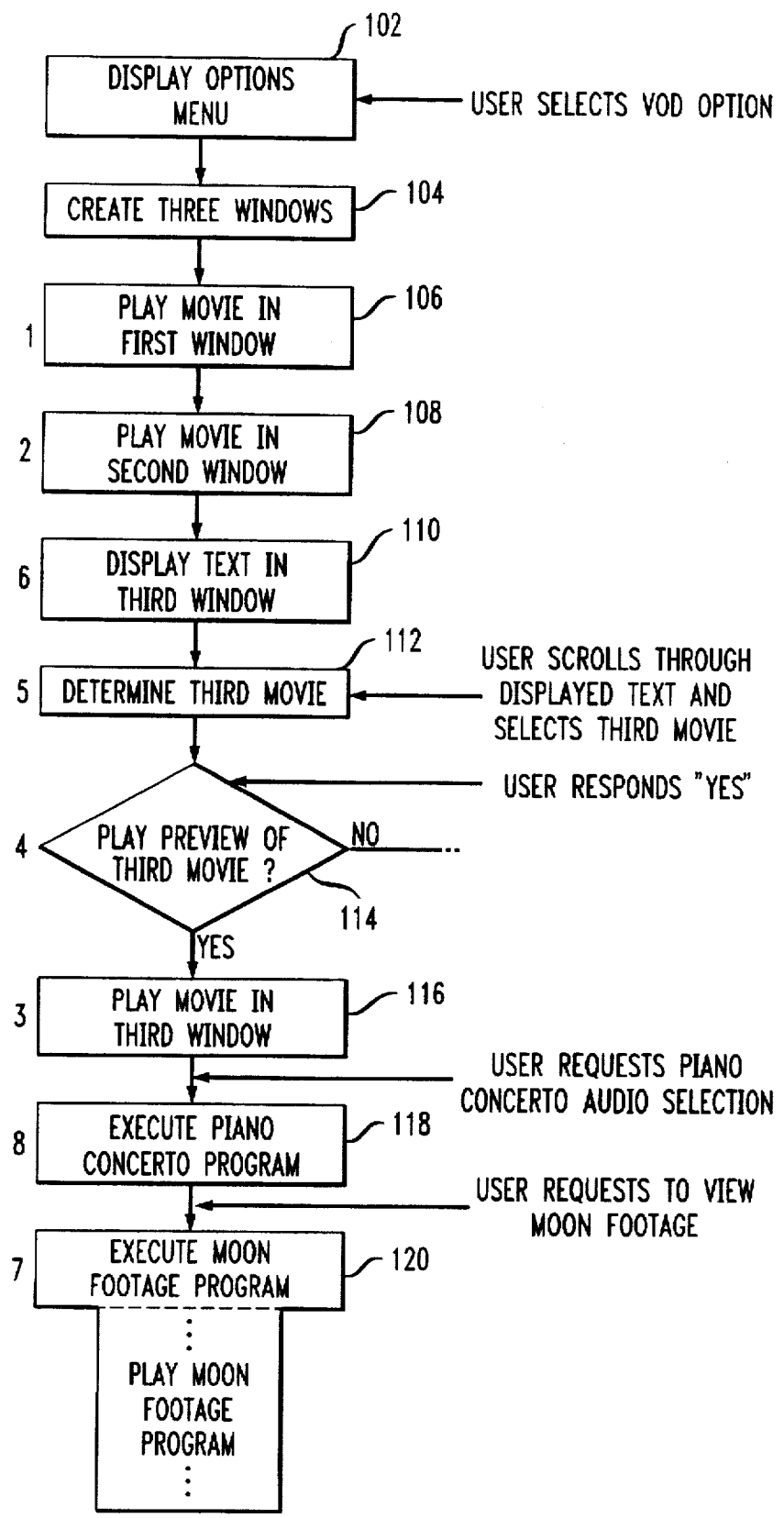
FIG. 1 shows, illustratively, a portion of a flowchart for a program that may be debugged by using the present invention.

Referring to FIG. 1, a flowchart for a program to be debugged is shown. For purposes of illustration, the flowchart may be considered a finite state machine representation of the program. Each step shown represents one state in a finite state machine representation of the program. Step 102 represents an initial state that displays an options menu to the user, one option of which is video-on-demand ("VOD"). The user selects the VOD option. As are all user inputs throughout FIG. 1, this user input is indicated by a double arrow.

Step 104 of the program creates three windows. Step 106 PLAYs a preview of the most requested movie for a previous time period (e.g., a month) in a first window. Step 108 PLAYs a preview of the second most requested movie for a previous time period in a second window. Both of these PLAY commands were issued by the ITV system. As shown in step 110, in a third window, text is shown that describes the other movies available. The text descriptions may be organized by date, alphabetically by title, by movie type (e.g., action, drama, romance, etc. . . .), or other scheme. In some of the above schemes, a user scrolling feature may be necessary. Step 112 prompts the user to identify a third movie, independent from the first two movies, based upon the text in the third window. Once the third movie is chosen, step 114 asks the user if a preview of the third movie is desired. If the user desires the preview of the third movie, the third movie preview will PLAY in the third window as shown in step 116. This PLAY command was issued by the user of the ITV system.

At this point, there are three PLAY commands (from steps 106, 108, and 116) to which the ITV system has responded and all PLAY commands are active simultaneously. These three PLAY commands require three decoders. Thus, based upon the assumptions above, there are no more available decoders.

Now, assume the user, while viewing the three previews, decides to request two additional functions. First, the user wants to listen to an audio selection (e.g., a piano concerto) while watching the three previews. This request is shown in step 118 and requires execution of a piano concerto program. Second, the user wants to PLAY five minutes of footage of when U.S. astronauts first landed on the moon in 1969. This request is shown in step 120 and requires execution of a moon footage program. The general mechanism by which such multiple requests may be handled is described in U.S. Pat. application Ser. No. 08/175,059, entitled "Method of Controlling Multiple Processes Using Finite State Machines". This patent application, which was filed Dec. 29, 1993 and assigned to the assignee of the present invention, is hereby incorporated by reference as if set forth in its entirety. Finally, to facilitate explanation, assume that the only other programs the VOD program may access are the piano concerto program and the moon footage program and that the piano concerto program and the moon footage program cannot access other programs or be accessed through programs other than the VOD program.

Figure 2:
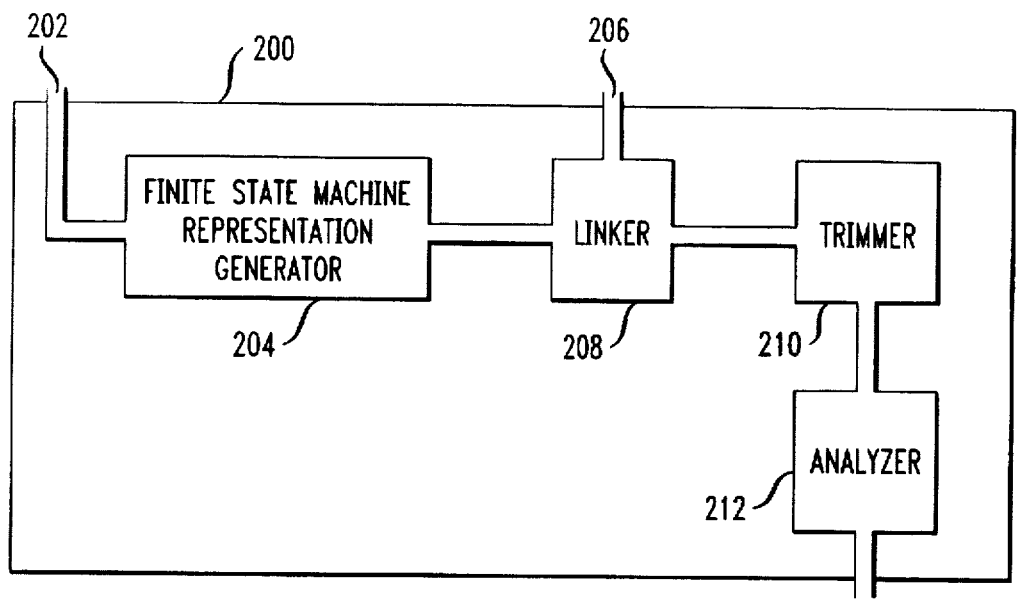
FIG. 2 shows, illustratively, a debugger made in accordance with the present invention.
Figure 3:
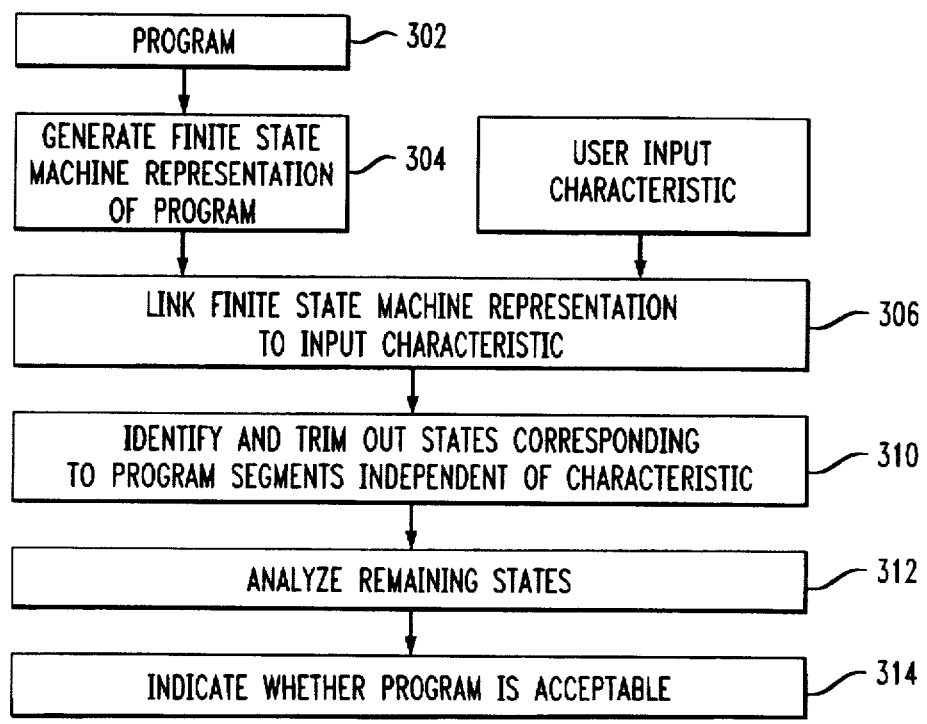
FIG. 3 shows a flowchart describing the method of operation of the debugger of FIG. 2 that may be applied to the flowchart of FIG. 1.

Referring to FIGS. 2 and 3, a debugger 200 and the method of operation thereof are shown. The debugger comprises an input 202, a finite state machine representation generator 204, a characteristics input 206, a linker 208, a trimmer 210, and an analyzer 212, all connected as shown. In accordance with step 302, a program to be debugged is input into the debugger via input 202. In accordance with step 304, the finite state machine representation generator 204 generates a finite state machine representing the program. The finite state machine representation generator 204 is typically a translator from programmed text to an appropriate finite state machine representation. Translators to perform such functions are well known to those skilled in the art. Aho, Sethi, and Ullman, "Compilers: Principles, Techniques, And Tools" Addison Wesley, 1986.

In accordance with step 306, the linker 208 accepts the finite state machine and a characteristic that is input by a debugger 200 user via input 206. The linker 208 links the finite state machine to the characteristic. A characteristic is an operational requirement, the violation of which is deemed to constitute a program bug or error. An example of a characteristic that may be entered via input 206 is the maximum number of decoders requested by the VOD program. This indicates the presence or absence of the need for additional decoders in the set top box or modification of the program. Another example of a characteristic is a deadlock indicator which would indicate the absence or presence of a deadlock. Thus, "characteristics" may, in some instances, be the same as system resources (e.g., the maximum number of decoders available). Also, characteristics may describe a particular type of state (e.g., deadlock). An example of a "deadlock" state would be one wherein a user was playing a game of chess against the ITV system and the ITV system neither moved or allowed or prompted the user to move. The operation of the trimmer 210 will now be described. The linking of the finite state machine to the characteristic could take place, for example, using Boolean algebra wherein if a state impacts the characteristic the state is assigned a logical "1" and otherwise the state is assigned a logical "0".

After the finite state machine is linked to the characteristic, three additional steps are performed. First, in accordance with step 310, trimmer 210 identifies and trims out the unnecessary portions of the program. In other words, the trimmer "tags" or labels those states in the finite state machine representation that have no impact upon the pending analysis and severs those tagged states from the finite state machine representation. Second, in accordance with step 312, the remaining portions are analyzed in accordance with analyzer 212 for the presence of a bug. Third, based upon the analysis performed in step 312, the debugger 200 determines whether the program is acceptable or unacceptable in step 314.

2. The Identifying and Trimming Step

As applied to FIG. 1, step 310 identifies and trims out certain states of the finite state machine representation that have no impact on the number of decoders requested. Illustratively, the debugger will determine whether the number of decoders requested by a program will exceed the number of decoders available in the system in which the program will be executed. For the first step, the debugger determines whether there is a state or subset of states that does not impact the number of decoders, ND. Each such state or subset of states is identified and trimmed out prior to the analysis step, rendering the remainder of the analysis (i.e., the analysis step) more computationally efficient. Trimming out may be accomplished by abstracting numerous states as one state and/or by removing states and modifying the transitions among the remaining states (e.g., connecting states A and C directly when previously they were only connected via intermediate state B). Those skilled in the art will realize that other approaches may be used to trim out states.

For example, referring to FIG. 1, the piano concerto program does not require a PLAY function or a STOP function. The debugging program may verify this by checking each state (e.g., the Boolean value for each state) of the piano concerto program for the presence of the PLAY function and the presence of the STOP function (also by, e.g., checking another Boolean value for each state). Once this verification is performed, all the states of the piano concerto program may be trimmed out since, as assumed above, the debugger program is to determine whether the number of decoders that could be requested by a user executing the program exceeded the number of decoders available.

The piano concerto program is external to the VOD program. However, even portions of the VOD program may be identified and trimmed. For example, all states associated with the user interaction for determining the third movie of interest (e.g., the scrolling feature) may be trimmed out of the VOD program prior to further analysis. This could be done based upon the Boolean values for these states. Just like the states of the piano concerto program, these states do not require the PLAY function.

Again referring to FIG. 1, a state of the moon footage program requires the PLAY function. This is apparent from the "code" shown in box 120 that states "PLAY moon footage program". The debugging program may verify this by checking the Boolean value for each state of the moon footage program for the presence of the PLAY function. Thus, the states of this program cannot be trimmed out.

3. The Analysis Step

Step 312 analyzes the remaining states of the finite state machine representation to determine whether the number of decoders requested while in any remaining state exceeds the number of decoders available in the ITV system in which the program will be executed. According to this analysis, the number of decoders requested by state 1, NDS1, is determined. Next, the maximum number of decoders that could be in active use just prior to entering state 1, NDSX, is determined. This may be done by analyzing each state from which state 1 can be entered. Next, NDS1 and NDSX are summed to determine the maximum number of decoders that could be requested when in state 1, NDSMAX(1). This process is repeated for each state or until a state, indicated by SBAD, is found for which NDSMAX(SBAD) is greater than the number of decoders available. If such a state exists, the program 302 is deemed unacceptable as per step 309 of FIG. 3. However, if no such state exists, the program is deemed acceptable.

As applied to FIG. 1, initially, the debugger program determines the number of decoders requested by state 1, NDS1. Note that the state numbers of each state appear immediately to the left of each box in FIG. 1. If state 1 is represented by box 106, NDS1 is equal to one. Next, it determines the maximum number of decoders that could be in active use just prior to entering state 1, NDSX. In this example, NDSX is zero. Next, the debugger program adds NDS1 and NDSX to determine the maximum number of decoders that could be requested when in state 1, NDSMAX(1). In this case NDSMAX(1) is equal to one. Next, the debugger program determines the number of decoders requested by state 2, NDS2. If state 2 is represented by box 108, NDS2 is equal to one. Next, it determines the maximum number of decoders that could be in active use just prior to entering state 2, NDSX. In this example, since state 2 (box 108) may only be entered from state 1 (box 106), NDSX is equal to NDSMAX(1), both of which are equal to one. Next, the debugger program adds NDS2 and NDSX to determine the maximum number of decoders that could be requested when in state 2, NDSMAX(2). In this case NDSMAX(2) is equal to two.

Next, the debugger program determines the number of decoders requested by state 3, NDS3. If state 3 is represented by box 116, NDS3 is equal to one. Next, it determines the maximum number of decoders that could be in active use just prior to entering state 3, NDSX. In this example, since state 3 (box 116) may only be entered from state 4 (box 114) which may only be entered from state 5 (box 112) which may only be entered from state 6 (box 410) which may only be entered from state 2 (box 408) and since states 4, 5, and 6 do not require the PLAY function, NDSX is equal to NDSMAX(2), both of which are equal to two. Next, the debugger program adds NDS3 and NDSX to determine the maximum number of decoders that could be requested when in state 3, NDSMAX(3). In this case NDSMAX(3) is equal to three.

Next, the debugger program determines the number of decoders requested by state 7, NDS7. If state 7 is represented by box 120, NDS7 is equal to one. Next, it determines the maximum number of decoders that could be in active use just prior to entering state 7, NDSX. In this example, since state 7 may only be entered from state 8 (box 118) which may only be entered from state 3 (box 116). As determined in the above paragraph, since NDSMAX(3) is equal to three and since 8 does not require the PLAY function, NDSX is equal to NDSMAX(3), both of which are equal to three. Next, the debugger program adds NDS7 and NDSX to determine the maximum number of decoders that could be requested when in state 7, NDSMAX(7). In this case NDSMAX(7) is equal to four. Since NDSMAX(7) is greater than the number of available decoders, namely three, the program is not acceptable.

If the number of decoders that could be in active use just prior to entering a state is unknown or variable, one of two approaches could be used. First, the program could automatically be deemed unacceptable. Second, a series of symbolic equations could be developed and solved, yielding a value for the variable that would allow the program to either be deemed unacceptable or further analyzed.

Those skilled in the art will realize that the STOP function, due to its impact on the number of decoders, would have to be checked also, via, e.g., Boolean values. However, for clarity of illustration, this was not done. Once the debugger deems the program unacceptable, the programmer will attempt to fix or debug the program. In this example, this may be accomplished by programming the system to prompt the user to identify which of the three movie windows to send a STOP command prior to requesting a program that requires a PLAY command.

The fact that the piano concerto program was identified and trimmed out allows the VOD program to be debugged using less memory than would otherwise be necessary. Also, the VOD program will be debugged in a more computationally efficient manner due to the fact that the piano concerto program was identified and trimmed out. For purposes of illustration, assume that the VOD, piano concerto, and moon footage programs contain 300, 50, and 50 lines of code, respectively. Further assume that the scrolling feature of the VOD program comprises 100 lines of code. Further assume that each line of code is represented by one state in a VOD, piano concerto, or moon footage finite state representation.

If the programs are viewed as independent (i.e., each program is an independently executing finite state machine), the number of states analyzed is the product of the number of states in each of the individual machines, namely 10,000 [200×50]. The "200" represents the 300 states in the VOD program minus 100 states of the scrolling feature part of the VOD program that were trimmed out of the VOD program. The "50" represents the moon footage states. This is an improvement from the 750,000 |300×50×50| states that would need to be analyzed without the benefits of the present invention.

Even if the programs are viewed as dependent, the number of states analyzed is greatly reduced. Using the above example, one would have to analyze 250 states ( 200 from the VOD program and 50 from the moon footage program). This is also an improvement from the 400 states (300+50+ 50) that would need analysis without using the present invention.

While one might wonder why programs would be written independently since it requires so much more memory space and computation, programs are not written in an independent fashion on purpose. Typically, programmers do not think of analysis issues. For example, if a programmer needs to check if the variable X is less than 5, a calculator finite state machine may be called that returns a "YES" or a "NO". This is an independent finite state machine for purposes of analysis. However, if the determination regarding the value of the variable X was made "in-line", the lines of code would simply be represented as part of the larger finite state machine of the program, simplifying the analysis.

Additionally, in ITV systems, "programmers" may not be performing all of the programming. Some of the "programming" may be performed by artists via a graphical user interface ("GUI"). Since artists may tend to be less conscious of tracking things that programmers might track (e.g., the number of decoders currently requested), the present invention can be of great assistance. Further, even for experienced programmers, the present invention can be of great assistance since no programmer knows, for example, at what point of execution of the program a user may make an additional request. The programs that are debugged in accordance with the debugger 200 may be installed on or "published to" an ITV system and result in a higher degree of confidence that user requests may be processed by the ITV system.

Although the invention has been described with respect to a multimedia system, and more particularly an ITV system, those skilled in the art will realize that the descriptions above are for purposes of illustration only. Many variations to the above description will be apparent to those skilled in the art. For example, depending upon the system in which the program is designed to execute, other characteristics, in addition to "deadlocks" and "number of decoders", could be input. For example, system requirements associated with functions of a program, such as processor execution time and/or required bandwidth between a server and the decoders, may be used. Also, the maximum number of decoders that a program should require may be checked regardless of whether this is less than or equal to the maximum number of decoders available in the system. The last particular example may be used to check for other characteristics also. Also, the system could check for "livelock", which is a condition wherein the system repeatedly cycles through a given set of states with no possibility of exiting. Additionally, the system could check for "liveness", which is a condition wherein the occurrence of certain events implies that some other event(s) will occur in the future (e.g., if a VOD is requested, one will play). Further, more than one characteristic could be input at a time. This would enable one to check for different characteristics simultaneously (i.e., without having to run the program through the debugger more than once). Finally, a symbolic program comprises programmer specified arrangement of symbols associated with desired operations and their operands. Those skilled in the art will realize that there are many variations of the above described embodiment. Thus, the invention is defined by the appended claims.

What we claim is:

1. A debugger for debugging an interactive software program in accordance with a set of characteristics, the interactive software program including a plurality of finite events the debugger comprising:

means for linking the set of characteristics to a symbolic representation of the interactive software program;

means for identifying a first portion of the symbolic representation unassociated with the set of characteristics and a second portion of the symbolic representation associated with the set of characteristics and representative of a selected set of the plurality of finite events; and means for analyzing the second portion of the symbolic representation in substantial absence of analyzing the first portion of the symbolic representation, the second portion being mutually exclusive from the first portion, said analyzing means operative to determine whether the selected set of the plurality of finite events is debugged.

2. The debugger of claim 1 further comprising means for indicating whether the program is debugged.

3. The debugger of claim 1 wherein the symbolic representation of the program is a finite state machine representation.

4. The debugger of claim 1 wherein the set of characteristics comprises a number representing a maximum number of decoders available in the system on which the program will be executed.

5. The debugger of claim 4 wherein the program is an ITV application program.

6. The debugger of claim 1 wherein the set of characteristics is comprised of a deadlock.

7. The debugger of claim 1 wherein the set of characteristics comprises an amount of bandwidth.

8. The debugger of claim 1 further comprising means for generating the symbolic representation of the interactive software program.

9. A circuit implemented method of debugging an interactive software program in accordance with a set of characteristics, the interactive software program including a plurality of finite events, the method comprising:

linking the set of characteristics to a symbolic representation of the interactive software program;

identifying a first portion of the symbolic representation unassociated with the set of characteristics and a second portion of the symbolic representation associated with the set of characteristics and a representative of a selected set of the plurality of finite events; and analyzing the second portion of the symbolic representation associated with the set of characteristics in substantial absence of analyzing the first portion of the symbolic representation, the second portion being mutually exclusive from the first portion so that a determination can be made whether the selected set of the plurality of finite events of the interactive software program is acceptable based upon said analyzing step.

10. The method of claim 9 further comprising the step of indicating whether the program is debugged.

11. The method of claim 9 wherein the symbolic representation of the program is a finite state machine representation.

12. The method of claim 9 wherein the set of characteristics is comprised of a number representing a maximum number of decoders available in the system on which the program will be executed.

13. The method of claim 12 wherein the program is an ITV application program.

14. The method of claim 9 wherein the set of characteristics is comprised of a deadlock.

15. The method of claim 9 wherein the circuit comprises a programmed processor.

16. The method of claim 9 wherein the set of characteristics comprises an amount of bandwidth.

17. The method of claim 9 further comprising the step of generating the symbolic representation of the interactive software program.

18. A circuit implemented method of responding to a request by a user of interactive software program services, the method comprising:

identifying a set of interactive software programs with each interactive software program including a plurality of finite events which when executed would satisfy the request; and executing the set of interactive software programs, at least one interactive software program in the set of interactive software programs having been input into a debugger and having been generated in accordance with a set of characteristics and in accordance with the steps of:

linking the set of characteristics to a symbolic representation of the at least one interactive software program;

identifying a first portion of the symbolic representation unassociated with the set of characteristics and a second portion of the symbolic representation associated with the set of characteristics and representative of a selected set of plurality of finite events; and analyzing the second portion of the symbolic representation associated with the set of characteristics in substantial absence of analyzing the first portion of the symbolic representation, the second portion being mutually exclusive from the first portion, so that a determination can be made whether the selected set of plurality of finite events of the at least one interactive software program in the set of interactive software programs is debugged based upon said analyzing step.

19. The method of claim 18 wherein the at least one program is further generated in accordance with the step of indicating whether the program is debugged based upon an analysis of the second portion.

20. The method of claim 18 wherein the symbolic representation of the program is a finite state machine representation.

21. The method of claim 18 wherein the set of characteristics is comprised of a number representing the maximum number of decoders available in the system on which the program will be executed.

22. The method of claim 18 wherein the set of characteristics is comprised of a deadlock.

23. The method of claim 18 wherein the program is an ITV application program.

24. The method of claim 18 wherein the circuit comprises a programmed processor.

25. The method of claim 18 wherein the set of characteristics comprises an amount of bandwidth.

26. The method of claim 18 wherein the circuit comprises a programmed processor.

27. A debugger for debugging a symbolic program in accordance with a set of characteristics, the symbolic program including a plurality of finite events, the debugger comprising:

means for linking the symbolic program to the set of characteristics;

means for identifying a first portion of the symbolic program unassociated with the set of characteristics and a second portion of the symbolic program associated with the set of characteristics and representative of a selected set of the plurality of finite events; and means for analyzing the second portion of the symbolic program associated with the set of characteristics in substantial absence of analyzing the first portion of the symbolic program, the second portion being mutually exclusive from the first portion, said analyzing means operative to determine whether the selected set of the plurality of finite events of the symbolic program is debugged based upon said analyzing step.

28. A circuit implemented method of debugging a symbolic program in accordance with a set of characteristics, the symbolic program including a plurality of finite events the method comprising:

linking the set of characteristics to the symbolic program;

identifying a first portion of the symbolic program unassociated with the set of characteristics and a second portion of the symbolic program associated with the set of characteristics and representative of a selected set of the plurality of finite events; and analyzing the second portion of the symbolic program associated with the set of characteristics, the second portion being mutually exclusive from the first portion, so that a determination can be made whether the selected set of the plurality of finite events of the symbolic program is debugged based upon said analyzing step.

29. The method of claim 28 wherein the circuit comprises a programmed processor.

30. A circuit implemented method of responding to a request by a user of interactive software program services, the method comprising:

identifying a set of symbolic programs with each symbolic program including a plurality of finite events which when executed would satisfy the request; and executing the set of symbolic programs, at least one program in the set of symbolic programs having been input into a debugger and having been generated in accordance with a set of characteristics and in accordance with the steps of:

linking the set of characteristics to the set of symbolic programs;

identifying a first portion of the set of symbolic programs unassociated with the set of characteristics and a second portion of the set of symbolic programs associated with the set of characteristics and representative of a selected set of the plurality of finite events; and analyzing the second portion of the set of symbolic programs associated with the set of characteristics in substantial absence of analyzing the first portion of the set of characteristics, the second portion being mutually exclusive from the first portion so that a determination can be made whether the selected set of the plurality of finite events of the at least one program in the set of symbolic programs is debugged based upon said analyzing step.

31. A method of debugging an interactive software program containing a set of characteristics, the interactive software program including a plurality of finite events, comprising the steps of:

linking the set of characteristics to a symbolic representation of the interactive software program;

separating the symbolic representation into a first portion being unassociated with the set of characteristics and a second portion being associated with the set of characteristics and representative of a selected set of the plurality of finite events; and analyzing only the second portion of the symbolic representation in substantial absence of analyzing the first portion of the symbolic representation to determine whether the selected set of the plurality of finite events of the interactive software program is debugged.

32. The method of claim 31 further comprising the step of generating the symbolic representation of the interactive software program.

* * * * *